United States Patent [19]
Arai et al.

[11] Patent Number: 5,640,378
[45] Date of Patent: Jun. 17, 1997

[54] DISC RECORDING APPARATUS FOR RECORDING DATA IN UNITS OF A FULL CLUSTER

[75] Inventors: Kiyoshi Arai; Takashi Furukawa, both of Kanagawa, Japan

[73] Assignee: Sony Corporation, Tokyo, Japan

[21] Appl. No.: 295,759

[22] PCT Filed: Feb. 15, 1994

[86] PCT No.: PCT/JP94/00224

§ 371 Date: Oct. 13, 1994

§ 102(e) Date: Oct. 13, 1994

[87] PCT Pub. No.: WO94/19802

PCT Pub. Date: Sep. 1, 1994

[30] Foreign Application Priority Data

Feb. 25, 1993 [JP] Japan ................................ 5-061178

[51] Int. Cl.⁶ ................................................ G11B 7/00
[52] U.S. Cl. ....................... 369/58; 369/48; 369/54
[58] Field of Search ............................. 369/59, 54, 58, 369/47, 48, 32, 60, 124

[56] References Cited

U.S. PATENT DOCUMENTS

| | | |
|---|---|---|
| 5,243,588 | 9/1993 | Maeda et al. ............... 369/54 |
| 5,453,967 | 9/1995 | Aramaki et al. ............ 369/58 X |

FOREIGN PATENT DOCUMENTS

| | | | |
|---|---|---|---|
| 0512821 A3 | 11/1992 | European Pat. Off. ........ G11B 20/00 |
| 4-105271 | 4/1992 | Japan . |
| 4-301264 | 10/1992 | Japan . |
| WO 91/14265 | 9/1991 | WIPO ........................ G11B 20/10 |

*Primary Examiner*—Georgia Y. Epps
*Assistant Examiner*—P. W. Huber
*Attorney, Agent, or Firm*—Limbach & Limbach

[57] ABSTRACT

If data stored in RAM (31) is of a data volume short of one cluster, deficit data is read out from a magneto-optical disc (22) to provide a data volume corresponding to one cluster. Data recorded on the magneto-optical disc (22) is rewritten by means of the RAM (31) on the cluster basis under control of a system controller (29).

9 Claims, 6 Drawing Sheets

DISC RECORDING APPARATUS FOR RECORDING DATA IN UNITS OF A FULL CLUSTER

TECHNICAL FIELD

This invention relates to a disc recording apparatus in which data is formed in clusters and recorded on a disc on a cluster basis.

BACKGROUND ART

In a disc adapted for recording interleaved data thereon, data formed into clusters are recorded on the cluster basis in order to take data rewriting into account, as disclosed in, for example, JP Patent Kokai Publication No. 4-105271 or No. 4-301264.

As shown for example in FIG. 1, each cluster is constituted by a link sector and a data sector, and the length of the link sector is selected to be longer than an interleaving length. In this manner, each cluster is not affected by interleaving from neighboring clusters and recording and/or reproduction may be made independently on the cluster basis.

That is, with a disc on which data recorded thereon is interleaved data, data is recorded across plural sectors, without data being present independently on the sector basis. Consequently, rewriting of a particular sector cannot be performed by one operation and rewriting is to be performed on the cluster basis.

Meanwhile, in a disc recording apparatus in which data is grouped into clusters and recorded on the cluster basis, if data of the last cluster of main data for a writing 1 (first writing) is short of one full cluster, the portion of the cluster devoid of data is stuffed with void data to form one-cluster data and main data for the next writing 2 (second writing) is started with the next cluster. This indicates that a wasteful recording area 10 is produced as a result of stuffing the data free portion with void data.

Also, when rewriting data on the sector basis, data of the sector which belongs to the cluster to be rewritten and which is not rewritten has to be previously read out and combined with data which is to be rewritten and which is held on a random access memory. However, data readout needs to be made each time rewriting on the sector basis is performed, resulting in increased overhead until completion of recording.

In view of the above-described problems of the prior art, it is an object of the present invention to provide a disc recording apparatus in which the recording capacity of the disc may be fully utilized in carrying out recording, and in which accessing may be made expeditiously.

DISCLOSURE OF THE INVENTION

The present invention provides a disc recording apparatus for forming recording data into a cluster and recording the recording on a disc on the cluster basis. If, recording data supplied from the outside via input means is transiently stored in a memory and recorded by recording means on the disc, the recording data supplied from outside by one transfer operation has a data volume short of one cluster, the recording operation is suspended for transiently storing the data of the data volume less than one cluster in the memory. The deficit data is added to the data having the data volume less than one cluster on the memory during recording of the recording data having the data volume less than one cluster, in order to form one-cluster data. The recording data having the data volume corresponding to one cluster is supplied to the recording means and recorded on the cluster basis on the disc. With the disc recording apparatus of the present invention, there is no wasteful recording region produced even for writing a file next to the file completed in the midst of a cluster, thereby assuring recording which makes full utilization of the disc recording capacity.

According to the present invention, the control means causes one cluster data supplied from the memory to the recording means to be held on the memory after the data has been supplied to the recording means. Thus, with the disc recording apparatus of the present invention, efficient data accessing may be assured by decreasing the number of wasteful accessing operations.

According to the present invention, the control means controls the memory for supplying one-cluster recording data to the recording means each time the detection means detects that the recording data stored in the memory has reached the one-cluster volume. Thus, with the disc recording apparatus of the present invention, efficient data accessing may be assured by decreasing the number of wasteful accessing operations.

According to the present invention, when a timepiece means detects that the recording data has not been supplied for a pre-set time interval to the input means, the control means causes deficit data to be supplemented on the memory to the recording data short of one cluster. Thus, with the disc recording apparatus of the present invention, data having a data volume short of one cluster may be positively recorded on the disc.

According to the present invention, when an ejection detection means detects a disc ejection command, the control means causes deficit data to be added on the memory to the recording data short of one cluster. Thus, with the disc recording apparatus of the present invention, data having a data volume short of one cluster may be positively recorded on the disc.

According to the present invention, when the ejection detection means detects a disc ejection command, the control means controls the recording means so that data indicating the recording position on the disc of the one-cluster recording data supplemented with the deficit data is recorded on the disc. Thus, with the disc recording apparatus of the present invention, data having a data volume short of one cluster may again be positively recorded on the disc.

According to the present invention, if the data stored in the memory is of a data volume short of one cluster, the control means controls the readout means to read out deficit data from a cluster on the disc corresponding to data stored in the memory in order to generate one-cluster recording data in the memory. Sector-based accessing becomes possible with the cluster-based rewriting.

In addition, according to the present invention, if the timepiece means detects that recording data has not been supplied for a pre-set time interval to the input means, the control means controls the readout means to read out deficit data from a cluster on the disc corresponding to the data stored in the memory, for the recording data short of one cluster, in order to generate the one-cluster recording data on the memory. Thus, with the disc recording apparatus of the present invention, data having a data volume short of one cluster may again be positively recorded on the disc.

BEST MODE FOR CARRYING OUT THE INVENTION

Figure 1:
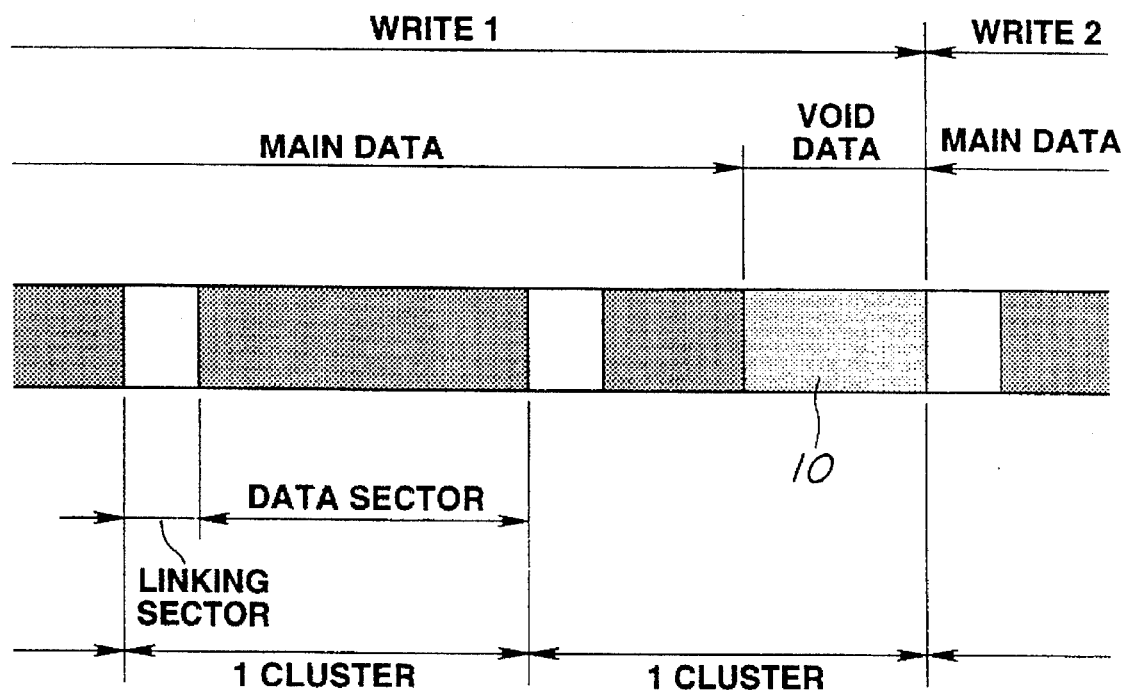
FIG. 1 schematically illustrates the recording state on a disc with the conventional disc recording apparatus.

Referring to the drawings, preferred embodiments of the disc recording apparatus according to the present invention will be explained in detail.

Figure 2:
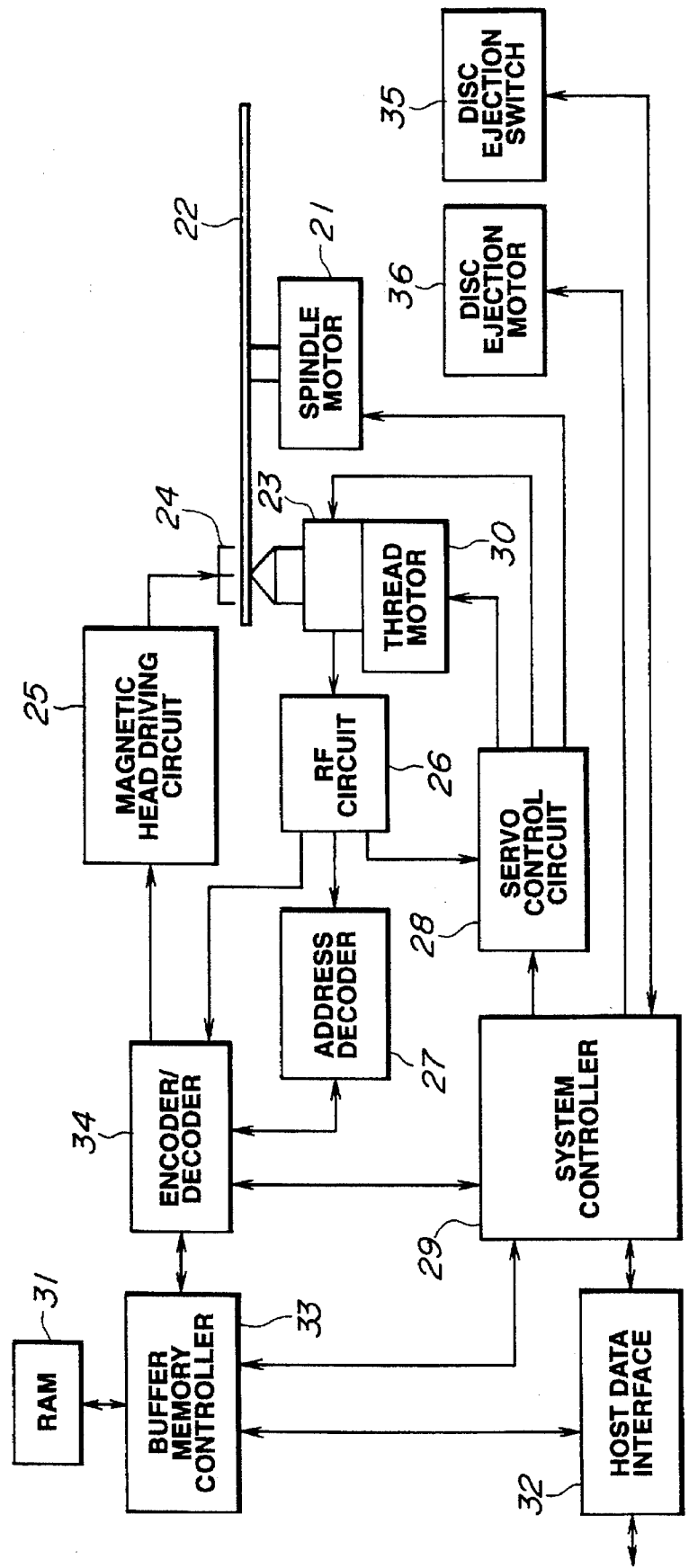
FIG. 2 is a block diagram showing the construction of an optical disc recording/reproducing apparatus according to the present invention.

FIG. 2 is a block diagram illustrating the schematic construction of an optical disc recording/reproducing apparatus embodying the present invention.

Figure 3:
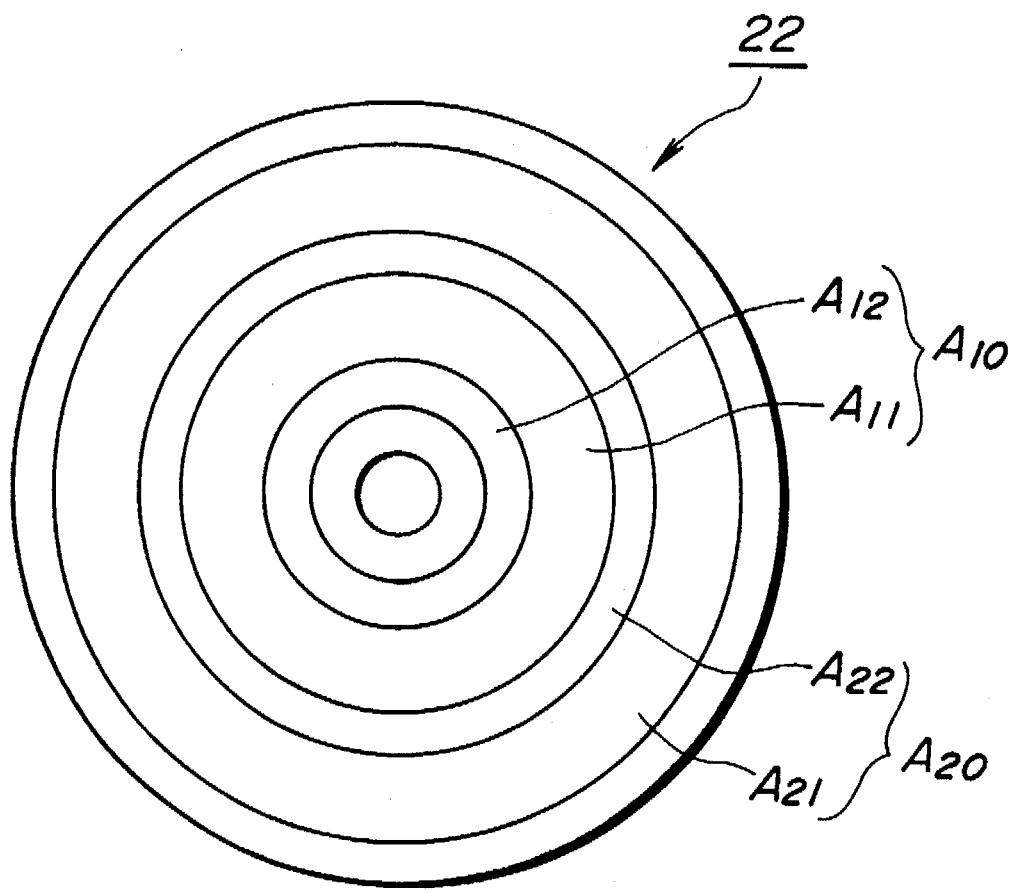
FIG. 3 is a schematic plan view for illustrating the construction of a magneto-optical disc employed in the optical disc recording/reproducing apparatus.

The optical disc recording/reproducing apparatus shown in FIG. 2 employs, as a recording medium, a disc wherein data grouped into clusters is recorded on the disc and/or reproduced from the disc on a cluster basis. A magneto-optical disc having a data recording/reproducing area for recording and reproducing the data, a replay-only optical disc having an area dedicated to data or reproduction or the magneto-optical disc having a data recording/reproducing area and an area dedicated to data reproduction, may be employed as a recording medium. Any of these discs is run in rotation at a constant linear velocity by a spindle motor 21. A magneto-optical disc 22 having a replay-only area $A_{10}$ and a recording/reproducing area $A_{20}$ provided outside of the replay-only area $A_{10}$, is adapted for being run in rotation at a constant linear velocity by the spindle motor 21, as shown for example in FIG. 3.

The replay-only area $A_{10}$ of the magneto-optical disc 22 includes a data region $A_{11}$ having program data, such as play data, recorded therein, and a lead-in region $A_{12}$ provided inwardly of the data region $A_{11}$. The replay-only area $A_{10}$ has pre-recorded therein digital data in the form of the presence or absence of pits corresponding to "1" or "0". In the lead-in region $A_{12}$, recording start address data and the recording end address data are recorded for the program data in its entirety as table-of-contents (TOC) data indicating the recording position and the recording contents in the lead-in region $A_{12}$.

The recording/reproducing area $A_{20}$ of the magneto-optical disc 22 has a data region $A_{21}$ for recording program data, such as play information, and a lead-in region $A_{22}$ provided inwardly of the data region. This recording/reproducing region $A_{20}$ represents the region of the magneto-optical recording medium. In the lead-in region $A_{22}$, there are recorded the track number information indicating a series of data recorded in each data region and the address data information indicating the position of each data region.

The optical disc recording/reproducing apparatus of the present embodiment applies a magnetic field modulated in accordance with data by a magnetic head 24 on the magneto-optical disc 22 rotated at a constant linear velocity by the spindle motor 21. A laser light is radiated on the magneto-optical disc 22 by an optical pickup 23, for recording data in accordance with the magnetic-field modulation, thereby recording along a recording track of the recording/reproducing area $A_{20}$ of the magneto-optical disc 22. The optical disc recording/reproducing apparatus of the present embodiment also causes the recording track in the replay-only area $A_{10}$ and the recording/reproducing area $A_{20}$ of the magneto-optical disc 22 to be traced with the laser beam by the optical pickup 23 for optical data reproduction. To this end, the optical disc recording/reproducing apparatus includes a magnetic head driving circuit 25 for driving the magnetic head 24 and an RF circuit 26 fed with the playback output produced by the optical pickup 23 as well as an address decoder 27 and a servo control circuit 28. The apparatus also includes a system controller 29 for controlling the system in its entirety and a thread motor 30 for causing movement of the optical pickup 23 and the magnetic head 24. The apparatus additionally includes a random access memory 31 (RAM) for storing data, a host data interface 32 for data exchange with the outside, a buffer controller 33 for managing data transfer, and an encoder/decoder 34 for performing a translating operation according to the data format. The apparatus also includes a disc ejection switch 35 for inputting an ejection command for the magneto-optical disc 22, and a disc ejection motor 36 for ejecting the magneto-optical disc 22.

When recording data on the recording/reproducing area $A_{20}$ of the magneto-optical disc 22, the optical pickup 23 radiates the laser beam on a target track of the magneto-optical disc 22, on which the magnetic field modulated in accordance with the recording data for thermo-magnetic data recording. The magnetic field is applied by the magnetic head 24 driven by the head driving circuit 25. The optical head 23 also detects the reflected laser light from the target track for detecting the focusing error by the so-called astigmatic method, while also detecting the tracking error by the so-called push-pull method. In addition, when reproducing data from the replay-only area $A_{10}$ of the magneto-optical disc 22, the optical pickup 23 detects changes in light volume of the laser light reflected by the target track and outputs the resulting replay signal. When reproducing data from the recording/ reproducing area $A_{20}$ of the magneto-optical disc 22, the optical pickup 23 detects the difference in the angle of polarization of the reflected laser light from the target track and outputs the resulting replay signal.

An output of the optical pickup 23 is routed to the RF circuit 26 shown in FIG. 2. The RF circuit 26 extracts focusing error signals and the tracking error signals from the output of the optical pickup unit 23 and routes the extracted signals to a servo controlling circuit 28, while converting the playback signals into bi-level signals which are routed to the address decoder 27 and to the encoder/decoder 34.

The servo controlling circuit 28 is made up of, for example, a focusing servo control circuit, a spindle servo control circuit and a thread servo control circuit. The focusing servo control circuit focusing controls the optical system of the optical pickup 23 so that the focusing error signal will be reduced to zero. The tracking servo control circuit tracking controls the optical system of the optical pickup 23 so that the tracking error signal will be reduced to zero. The spindle motor servo control circuit controls the spindle motor 21 for rotationally driving the magneto-optical disc 22 at a pre-set linear velocity. The thread servo control circuit controls the thread motor 30 for shifting the optical pickup 23 and the magnetic head 24 to a target track position of the magneto-optical disc 22 as designated by the system controller 29. The servo control circuit 28, implementing the above-described controlling operations, transmits the information indicating the operating states of various parts controlled by the servo control circuit 28 to the system controller 29.

The system controller 29 implements operational control in the write mode or the readout mode as designated by the control input information supplied via the host data interface 32 from an external host computer or based on the operation of a key input operating unit, not shown. The system controller 29 also manages the recording position or the playback position on the recording track traced by the optical pickup 23 and the magnetic head 24 based upon the sector-based address information reproduced from the recording track of the magneto-optical disc 22. The system controller 29 causes the TOC data read out from the lead-in region $A_{12}$ of the replay-only area $A_{10}$ of the magneto-optical disc 22 to be stored in the RAM 31 in order to manage the playback position in the data region $A_{11}$ of the replay-only area $A_{10}$ based upon the TOC data. In addition, the system controller 29 causes the TOC data read out from the lead-in region $A_{22}$ of the recording/reproducing area $A_{20}$ of the magneto-optical disc 22 to be stored in the RAM 31 in order to manage the recording position or the playback position in the data region $A_{21}$ of the replay-only area $A_{20}$ based upon the TOC data. Finally, the system controller 29 accepts a disc ejection command produced on actuation of the disc ejection switch 35 to drive the disc ejection motor 36 in order to cause ejection of the magneto-optical disc.

With the above-described optical disc recording/reproducing apparatus, the encoder/decoder 34 has its operational mode controlled by the system controller 29, such that, during readout mode, the system controller causes error correction decoding or EFM decoding to be performed on the bi-level output data of the RF circuit 26 for data reproduction. The playback data produced by the encoder/decoder 34 is stored via the buffer memory controller 33 in the RAM 31. The playback data is read out via the buffer memory controller 33 from the RAM 31 so as to be transferred to the outside via the host data interface 32.

Figure 4:
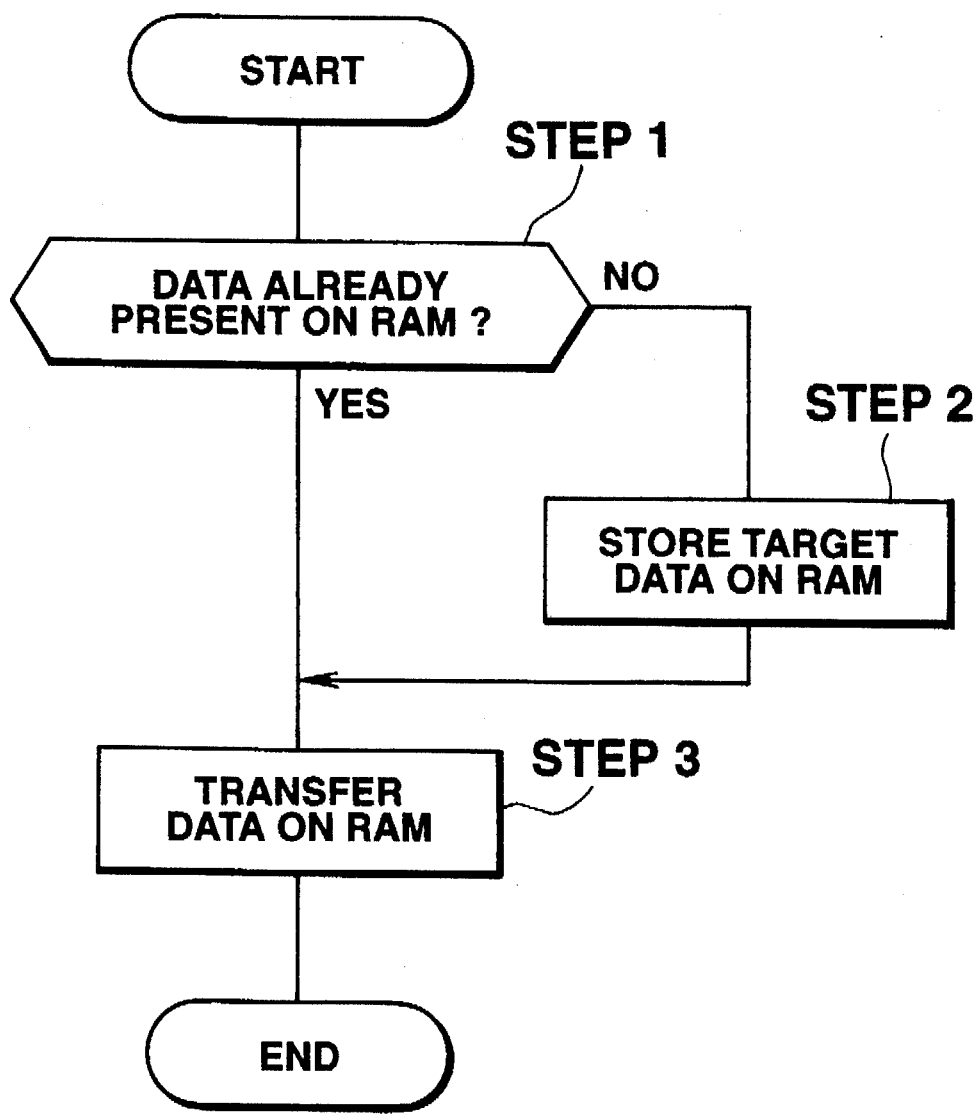
FIG. 4 is a flow chart for illustrating the control operation for the readout mode by a system controller in the above optical disc recording/reproducing apparatus.

That is, the system controller 29 is set to the read-out mode, when there is raised a readout request from the host computer, and controls the readout mode as indicated by the flow chart shown in FIG. 4.

At a step 1, it is checked whether or not there is the target data in the RAM 31. That is, it is checked whether or not there is the target data in the data previously read from the magneto-optical disc 22 and stored in the RAM 31. If the result of decision in the step 1 is NO, that is if there is no target data on the RAM 31, processing transfers to a step 2. If the result at the step 1 is YES, that is if there is the target data on the RAM 31, processing transfers to a step 3.

At the step 2, the servo control circuit 28 and the encoder/decoder 34 are controlled for reading out the target data from the magneto-optical disc 22. The buffer controller 33 is controlled for designating the location of data storage on the RAM 31, and the target data is read out from the magneto-optical disc 22 and stored in the RAM 31. After the target data is stored in the RAM 31, processing transfers to the step 3.

Figure 5:
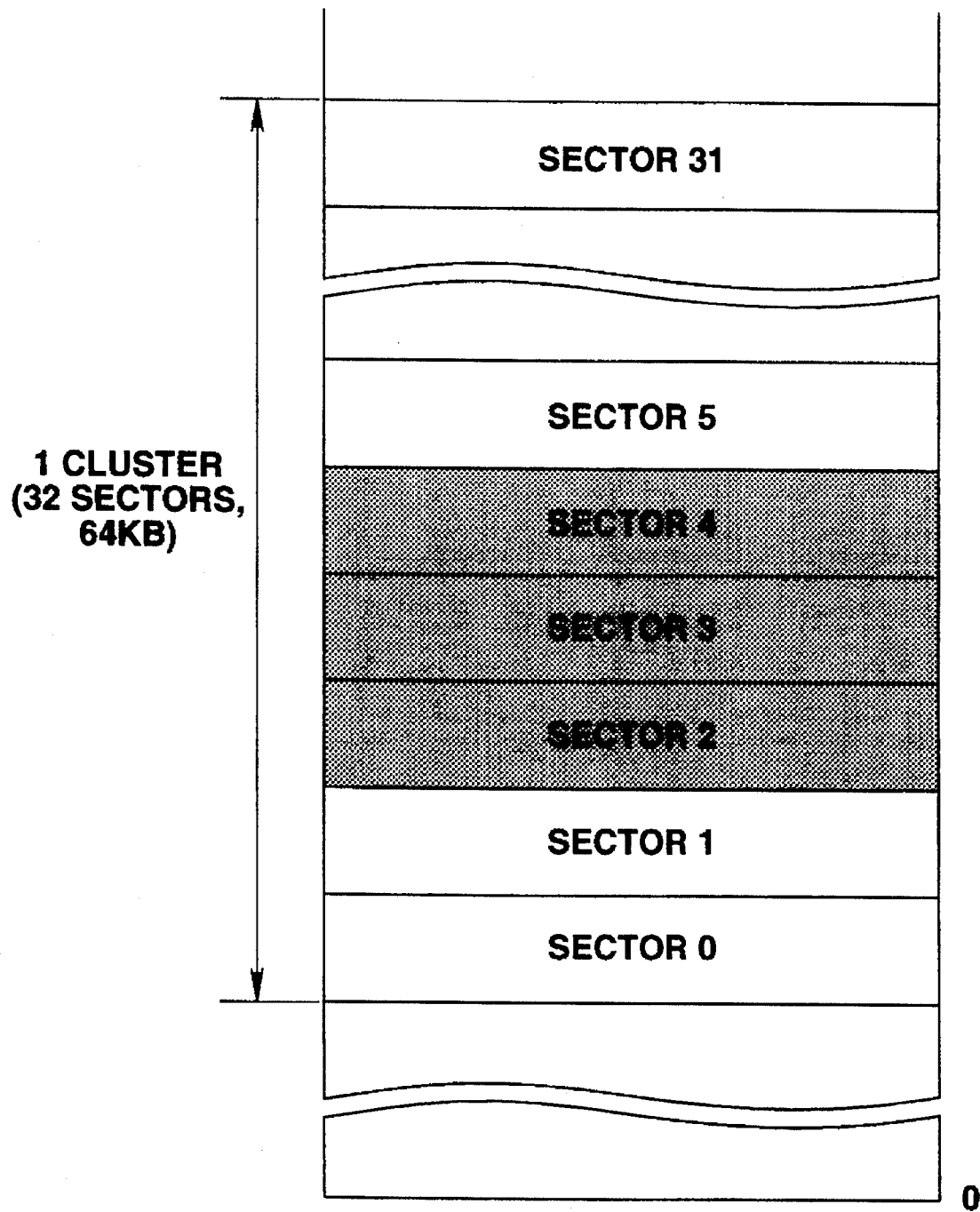
FIG. 5 schematically shows the data storage state in the above data recording/reproducing apparatus.

The storage area in the RAM 31 is partitioned into clusters and the target data is stored in the sector positions in the cluster to which the target data belongs. If, for example, sectors 2, 3 and 4 of a cluster which has not yet been read are read, data of the sectors 2, 3 and 4 are stored in the RAM 31, as indicated by shading in FIG. 5.

At the step 3, the buffer memory controller 33 is controlled so as to read the target data from the RAM 31. The data read out from the RAM 31 is transferred to the outside via the host data interface 32.

During the write mode, data transferred from outside via the host data interface 32 is stored in the RAM 31 via the buffer controller 33, while data read out from the RAM 31 via the buffer controller 33 is routed to the encoder/decoder 34. The encoder/decoder 34 performs encoding for error correction or EFM encoding on data routed thereto from the RAM 31 via the buffer memory controller 33. The data encoded by the encoder/decoder 34 is routed to the magnetic head driving circuit 25. The magnetic head driving circuit 25 is connected to the magnetic head 24 to drive the magnetic head 24 to apply the modulated magnetic field conforming to the data on the magneto-optical disc 22. During the recording mode, the system controller 29 automatically generates the above-mentioned TOC data table, indicating the recording position of the data region $A_{21}$ of the recording/reproducing area $A_{20}$, in the RAM 31, and causes the TOC data to be recorded in the lead-in region $A_{22}$ at the time of termination of the recording mode.

Figure 6:
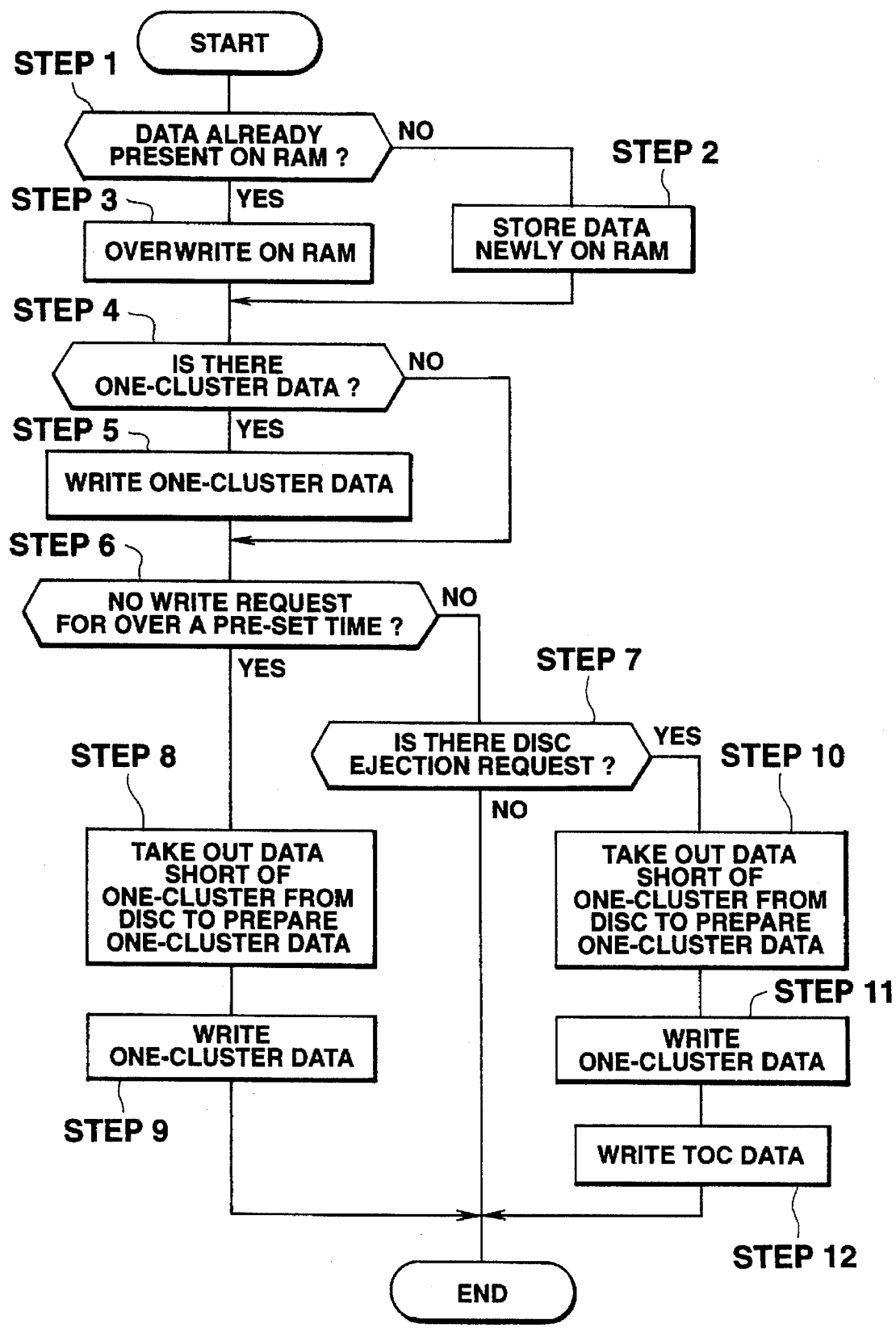
FIG. 6 is a flow chart for illustrating the control operation for the write mode by a system controller in the above optical disc recording/reproducing apparatus.

That is, when there is raised a write request from the host computer, the system controller 29 is set to the write mode, and performs the control operation for the write mode as shown by the flow chart of FIG. 6.

At a step 1, in FIG. 6, it is checked whether or not data of the same cluster as the data currently transferred from the host computer is present on the RAM 31. That is, it is checked whether or not any data of the same cluster as the data currently transferred form the host computer is present in the data previously transferred from the host computer and stored in the RAM 31. If the result of decision at the step 1 is NO, that is if there is no data of the same cluster as the data transferred from the host computer in the RAM 31, processing transfers to a step 2. If the result of decision at the step 1 is YES, that is if any data of the same cluster as the data currently transferred from the host computer is present on the RAM 31, processing transfers to a step 3.

At the step 2, the data currently transferred from the host computer is newly stored in the RAM 31. Processing then transfers to a step 4.

At the step 3, the data currently transferred from the host computer is overwritten in the storage location on the RAM 31 in which the data of the same cluster has been previously stored. Processing then transfers to the step 4.

At the step 4, it is checked whether or not there is all of the one-cluster data, for example, 62 KB data, on the RAM 31. If the result of decision at the step 4 is YES, that is if there is one-cluster data, at the step 4, processing transfers to a step 5. If the result of decision at the step 4 is NO, that is if there is no one-cluster data, processing transfers to a step 6.

At the step 5, the servo control circuit 28, buffer controller 33 and the encoder/decoder 34 are controlled for reading out one-cluster data from the RAM 31 and for recording the read-out data on the magneto-optical disc 22. After writing the one-cluster data on the magneto-optical disc 22, processing transfers to the step 6. In this manner, one-cluster data is written on the magneto-optical disc each time data stored in the RAM 31 reaches one cluster. That is, data recorded on the present magneto-optical disc 22 is rewritten thereon via the RAM 31 on the cluster basis.

In this manner, sector-based data is first recorded in the RAM 31 and, each time the data stored in the RAM 31 reaches one cluster, the one-cluster data is written on the magneto-optical disc 22. Thus, accessing is made on the cluster basis by the optical disc recording/reproducing apparatus, while it would appear to the host computer as though accessing is being made on the sector basis.

At the step 6, it is checked whether or not there has been made no write request from the host computer for a pre-set period of time. If the result of decision at the step 6 is NO, that is if within the pre-set time period as from the previous write request, processing transfers to a step 7. If the result of decision at the step 6 is YES, that is if there has been made no new write request within the pre-set time period since the previous write request, processing transfers to step 8.

At the step 7, it is checked whether or not a disc ejection request has been made. If the result of decision at the step 7 is NO, that is if there has been made no disc ejection request, the write mode is directly terminated, without effecting data writing. If the result of decision at the step 7 is YES, that is if the disc ejection request has been made, processing transfers to the step 10.

At the step 8, data on the RAM 31 short of one cluster is read out from the corresponding cluster of the magneto-optical disc 22 and supplemented into the cluster suffering from data deficit for preparing one-cluster data on the RAM 31. At the next step 9, the one-cluster data prepared at the step 8 on the RAM 31 is written on the magneto-optical disc 22 to terminate the recording mode.

At the step 10, data on the RAM 31 short of one cluster is read out from the corresponding cluster of the magneto-optical disc 22 and supplemented into the cluster suffering from data deficit for preparing one-cluster data on the RAM 31. At the next step 11, the one-cluster data prepared at the step 10 on the RAM 31 is written on the magneto-optical disc 22. At the next step 12, the above-mentioned TOC data is recorded in the lead-in region $A_{22}$ to terminate the recording mode.

Whether or not data readout/writing is to be performed using the regions on the RAM 31 partitioned on the cluster basis is managed by the system controller 29.

If data less than one cluster, stored in the RAM 31, is to be written in the magneto-optical disc 22, the system controller 29 controls the servo control circuit 28, buffer controller 33 and the encoder/decoder 34 so that the deficit data of the cluster is read from the corresponding cluster in the magneto-optical disc and synthesized on the RAM 31 to form a 64 KB one-cluster data which is then written on the magneto-optical disc 22. For rewriting data present across plural classes, the deficit cluster data of the leading cluster and the trailing cluster are read from the corresponding clusters of the magneto-optical disc 22 to form one-cluster data on the RAM 31 and the one-cluster data thus formed are then written on the magneto-optical disc 22. Meanwhile, data short of one full cluster, produced at the trailing portion of a data file, is written on the magneto-optical disc 22 by the above-mentioned rewriting control and simultaneously left in the RAM 31. The data thus left in the RAM 31 is then synthesized in the RAM 31 with the leading data portions of the next file to form one-cluster data which is again written on the magneto-optical disc 22. In this manner, there is no possibility of wasteful recording region being produced on the magneto-optical disc 22, so that it becomes possible to make full utilization of the storage capacity of the magneto-optical disc 22.

Also, the system controller 29 has the timepiece function of detecting whether or not there is a write request from the outside for a pre-set time interval. In the absence of the write request from outside for a pre-set time, the system controller 29 controls the servo control circuit 28, buffer controller 28 and the encoder/decoder 34 so that deficit data of a cluster short of data is read out from the corresponding cluster of the magneto-optical disc and synthesized with the cluster data to form 64 KB one-cluster data on the RAM 31, which one-cluster data is written on the magneto-optical disc 22.

In addition, the system controller 29 monitors the loading and the unloading of the magneto-optical disc 22 on and from a disc drive, not shown. Thus, when the system controller 29 accepts the disc ejection command issued on actuation of the disc ejection switch 35 and drives the disc ejection motor 36 in order to eject the magneto-optical disc 22, the system controller causes deficit data of a cluster short of data on the RAM 31 to be read from the corresponding cluster on the magneto-optical disc 22 to synthesize a 64 KB one-cluster data on the RAM 31, which 64 KB one-cluster data is written on the magneto-optical disc 22. Thus the loading and unloading of the magneto-optical disc 22 with respect to the disc drive is monitored so that rewrite control of deficit data of a cluster on the RAM 31 short of data is performed when the magneto-optical disc 22 is unloaded from the disc drive for positively storing the data having a volume less than one cluster on the magneto-optical disc 22.

Meanwhile, when the magneto-optical disc 22 is unloaded from the disc drive, the rewrite control for the deficit data of the cluster on the RAM 31 short of data is performed as described above, at the same time as data indicating the cluster in which the deficit data has been rewritten is written in the lead-in region $A_{22}$ of the recording/reproducing area $A_{20}$ of the magneto-optical disc 22 as, for example, TOC data. When loading the disc, the deficit data is read out from the cluster and stored in the RAM 31 based upon the TOC data read out from the lead-in region $A_{22}$. The data thus stored in the RAM is synthesized on the RAM 31 with data transmitted from the host computer in order to form one-cluster data which is again written in the magneto-optical disc 22. This eliminates any wasteful recording area on the magneto-optical disc 22 to render it possible to make full utilization of the recording capacity of the magneto-optical disc 22.

I claim:

1. A disc recording apparatus for forming recording data into clusters and recording the clusters of recording data on a disc, the disc recording apparatus comprising:

input means via which the recording data enters the apparatus from outside;

a memory for transiently storing the recording data supplied via said input means;

recording means for recording said recording data on said disc; and control means for suspending the recording of the recording data if the recording data supplied from outside by a transfer operation has a data volume short of one cluster, for transiently storing the data of the data volume less than one cluster in said memory, for supplementing the transiently stored data of the data volume of less than one cluster with deficit data to form one-cluster data, for supplying the recording data having the data volume corresponding to one cluster to said recording means and for recording the one-cluster data on a cluster basis on said disc.

2. The disc recording apparatus as claimed in claim 1, wherein said control means comprises detection means for detecting that the recording data stored in said memory has reached one cluster and controls said memory so that, each time it is detected that the data stored in said memory has reached the volume of one cluster, the one-cluster recording data is supplied to said recording means.

3. The disc recording apparatus as claimed in claim 1, wherein said control means holds the one-cluster data supplied from said memory to said recording means in said memory even after the data is supplied to said recording means.

4. A disc recording apparatus for forming recording data into a cluster recording the clusters of recording data on a disc, the disc recording apparatus comprising:

input means via which the recording data enters the apparatus from outside;

a memory for transiently storing the recording data supplied via said input means;

recording means for recording said recording data on said disc; and control means for suspending the recording of the recording data if the recording data supplied from outside by a transfer operation has a data volume short of one cluster, for transiently storing the data of the data volume less than one cluster in said memory, for supplementing the transiently stored data of the data volume of less than one cluster with deficit data during recording thereof to form one-cluster data, for supplying the recording data having the data volume corresponding to one cluster to said recording means and for recording the one-cluster data on a cluster basis on said disc;

wherein said control means comprises timepiece means for detecting that the recording data has been supplied to said input means for a pre-set time, said control means causing deficit data to be supplemented on said memory to the recording data short of one cluster if no recording data has been supplied for a pre-set time.

5. A disc recording apparatus for forming recording data into a cluster recording the clusters of recording data on a disc, the disc recording apparatus comprising:

input means via which the recording data enters the apparatus from outside;

a memory for transiently storing the recording data supplied via said input means;

recording means for recording said recording data on said disc; and control means for suspending the recording of the recording data if the recording data supplied from outside by a transfer operation has a data volume short of one cluster, for transiently storing the data of the data volume less than one cluster in said memory, for supplementing the transiently stored data of the data volume of less than one cluster with deficit data during recording thereof to form one-cluster data, for supplying the recording data having the data volume corresponding to one cluster to said recording means and for recording the one-cluster data on a cluster basis on said disc;

wherein said control means comprises ejection detection means for detecting a command for ejecting said disc, said control means causing deficit data to be supplemented on said memory to the recording data short of one cluster on detection of the command for disc ejection.

6. A disc recording apparatus for forming recording data into a cluster recording the clusters of recording data on a disc, the disc recording apparatus comprising:

input means via which the recording data enters the apparatus from outside;

a memory for transiently storing the recording data supplied via said input means;

recording means for recording said recording data on said disc; and control means for suspending the recording of the recording data if the recording data supplied from outside by a transfer operation has a data volume short of one cluster, for transiently storing the data of the data volume less than one cluster in said memory, for supplementing the transiently stored data of the data volume of less than one cluster with deficit data during recording thereof to form one-cluster data, for supplying the recording data having the data volume corresponding to one cluster to said recording means and for recording the one-cluster data on a cluster basis on said disc;

wherein said control means controls said recording means so that, on detection of the command for disc ejection, data indicating the recording position on the disc of the one-cluster data supplemented with the deficit data is recorded on the disc.

7. A disc recording apparatus for forming recording data into a cluster recording the clusters of recording data on a disc, the disc recording apparatus comprising:

input means via which the recording data enters the apparatus from outside;

a memory for transiently storing the recording data supplied via said input means;

recording means for recording said recording data on said disc; and control means for suspending the recording of the recording data if the recording data supplied from outside by a transfer operation has a data volume short of one cluster, for transiently storing the data of the data volume less than one cluster in said memory, for supplementing the transiently stored data of the data volume of less than one cluster with deficit data during recording thereof to form one-cluster data, for supplying the recording data having the data volume corresponding to one cluster to said recording means and for recording the one-cluster data on a cluster basis on said disc; wherein:

said control means controls said readout means so that, if data stored in said memory is of a volume less than one cluster, deficit data is read out from a cluster on said disc corresponding to the data stored in said memory, so as to form one-cluster recording data on said memory.

8. The disc recording apparatus as claimed in claim 7, wherein said control means comprises timepiece means for detecting that the recording data has not been supplied to said input means for a pre-set time, said control means causing said readout means to read out deficit data from a cluster on the disc corresponding to data stored in said memory, for the recording data short of one cluster, when the recording data is not supplied for a pre-set time, in order to generate one-cluster recording data in said memory.

9. A disc recording apparatus for recording data on a disc, the disc recording apparatus comprising:

input means for receiving data from a source external to the disc recording apparatus;

a memory for receiving the data from the input means and for storing the data;

recording means for receiving the data from the memory and recording it on the disc; and control means for controlling the recording means to suspend recording until a full cluster of data is stored in the memory and to then record the full cluster of data on the disc, wherein when the memory does not receive a full cluster of data from the input means, and the control means adds deficit data to the data stored in the memory so that a full cluster of data is stored in the memory.

* * * * *